United States Patent
Sbongk

(10) Patent No.: US 11,628,799 B2
(45) Date of Patent: Apr. 18, 2023

(54) BELT GUIDE

(71) Applicant: ILLINOIS TOOL WORKS INC., Glenview, IL (US)

(72) Inventor: Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/404,108

(22) Filed: Aug. 17, 2021

(65) Prior Publication Data
US 2022/0055571 A1   Feb. 24, 2022

(30) Foreign Application Priority Data

Aug. 21, 2020   (DE) ...................... 10 2020 121 970.9
Jul. 21, 2021   (DE) ...................... 10 2021 118 922.5

(51) Int. Cl.
*B60R 22/12*   (2006.01)
*B60R 22/18*   (2006.01)

(52) U.S. Cl.
CPC .............. *B60R 22/12* (2013.01); *B60R 22/18* (2013.01); *B60R 2022/1818* (2013.01)

(58) Field of Classification Search
CPC ............................................. B60R 2022/1818
See application file for complete search history.

(56) References Cited

U.S. PATENT DOCUMENTS

| | | | |
|---|---|---|---|
| 5,390,977 A * | 2/1995 | Miller | B60R 22/185 |
| | | | 297/483 |
| 2008/0030013 A1* | 2/2008 | Burghardt | B60R 22/26 |
| | | | 297/483 |
| 2014/0252840 A1* | 9/2014 | Seyffert | B60R 22/201 |
| | | | 297/468 |
| 2016/0137160 A1* | 5/2016 | Dingman | B60R 22/28 |
| | | | 280/801.2 |
| 2017/0267209 A1* | 9/2017 | Wang | B60R 22/30 |
| 2019/0202396 A1* | 7/2019 | Kaltschmidt | B60R 22/26 |
| 2019/0315310 A1 | 10/2019 | Jaradi | |
| 2020/0017065 A1* | 1/2020 | Wang | B60R 22/024 |
| 2020/0331425 A1* | 10/2020 | Loecherer | B60R 22/24 |
| 2021/0362671 A1* | 11/2021 | Wolf | B60R 22/18 |
| 2022/0219640 A1* | 7/2022 | Bittner | B60R 22/023 |

FOREIGN PATENT DOCUMENTS

DE   102019109815 A1   10/2019

* cited by examiner

*Primary Examiner* — Barry Gooden, Jr.
(74) *Attorney, Agent, or Firm* — Thompson Hine LLP

(57) ABSTRACT

A belt guide (2) having a base structure (9) and a bracket part (13), wherein the base structure (9) includes a body contact portion (17) configured to abut a body part (3), wherein the bracket part (13) is connected to the base structure (9) via a connecting structure and includes a belt contact surface (19) facing the base structure (9) to guide a belt between itself and the body part (3) or the base structure (9), wherein the connecting structure is configured to hold the bracket part (13) such that it cannot move relative to the base structure (9) in a normal state and to yield under the action of a predetermined load, in particular a load acting from the direction of the body part (3), to allow the bracket part (13) to move relative to the base structure (9) toward the body contact portion (17) in a release state.

13 Claims, 4 Drawing Sheets

BELT GUIDE

TECHNICAL FIELD

The invention relates to a belt guide for guiding a seatbelt on a body part of a motor vehicle.

BACKGROUND

A seatbelt guide assembly is described in DE 10 2019 109 815 A1. This seatbelt guide assembly includes a seatbelt guide comprising a slot. A webbing extends through the slot. A releasable rod is supported by the seatbelt guide and extends across the slot. The releasable rod releases during a vehicle impact to allow the webbing to move along the slot to reduce a compression of the chest of an occupant during the vehicle impact.

Guiding the seatbelt of a vehicle for a driver or front seat passenger through a belt guide in the B-pillar of the vehicle is well known. The belt guide conventionally consists of a welded on or otherwise attached steel bracket or a plastic part that is, for example, clamped to the sheet metal of the B-pillar. In the region of the belt cover, the B-pillar is provided with a plastic covering. Due to its relative flexibility in comparison to body parts and its flatness, the covering can provide some protection for a shoulder of the vehicle occupant in the event of a side impact. If the side impact occurs at the height of the belt guide, however, there is a risk that the rigid belt guide will shift toward the interior of the vehicle and strike the shoulder of the vehicle occupant despite the covering or through said covering. This involves a high risk of injury.

SUMMARY

One object of the invention is to create a belt guide that avoids or reduces the drawbacks in the state of the art. Subtasks of the invention can consist of providing a belt guide having improved side impact protection and reduced risk of injury to vehicle occupants.

At least partial aspects of the object are achieved by the features of the independent Claim 1. Advantageous further developments and preferred embodiments are the subject matter of the subclaims.

According to one aspect of the invention, a belt guide having a base structure and a bracket part is proposed, wherein the base structure comprises a body contact portion which is configured to abut a body part, wherein the bracket part is connected to the base structure via a connecting structure and comprises a belt contact surface which faces the base structure to guide a belt between itself and the body part or the base structure abutting the body part, wherein the connecting structure is configured to hold the bracket part such that it cannot move relative to the base structure in a normal state and to yield under the action of a load which is at or exceeds a predetermined limit, in particular a load acting perpendicular to said body part, to allow the bracket part to move relative to the base structure toward the body contact portion in a release state.

The body part can be a side pillar, in particular a B-pillar, of a motor vehicle.

When the bracket part enters the release state under the action of the load at or exceeding the predetermined limit, it can yield toward the body part. This can reduce the force with which the belt guide moves into the passenger compartment during a side impact. This can significantly improve safety, in particular in a high-speed side impact.

The load can in particular be a load caused by a side impact. The limit may be dictated by accident protection standards or tests.

With the belt guide according to the invention, it is thus possible to absorb some of the energy that acts on the driver during a side impact. This is achieved by connecting the bracket part to the base structure via the connecting structure, wherein the connecting structure is configured to hold the bracket part such that it cannot move relative to the base structure in a normal state and to yield under the action of a load which is at or exceeds a predetermined limit, in particular a load acting perpendicular to said body part, to allow the bracket part to move relative to the base structure toward the body contact portion in a release state.

When a force is applied to the bracket part in the event of a crash (side impact), the bracket part yields in accordance with connecting structures, preferably preset breaking points, provided between the bracket part and the base part, and can in particular be separated from elastic spring elements via the preset breaking points and can then move into the body part, in particular the B-pillar.

The risk of injury can thus be reduced. This is achieved by special connecting structures, in particular preset breaking points, that allow the bracket to "submerge."

A belt guide is used to guide a seatbelt in a B-pillar. To date, this function has been fulfilled by steel or sheet metal brackets that are rigidly connected to the B-pillar.

The belt guide according to the invention can be made in one piece of plastic. The present invention is the first to provide a belt guide which can be made or consist entirely of plastic.

In addition, due to its construction, the belt guide is lightweight.

Simple manually assembly is possible as well.

In embodiments, the connecting structure forms an integral connection between the base structure and the bracket part in the normal state and comprises at least one connecting point that breaks under the action of the predetermined load to cause the release state. In other words, the belt guide is produced in one piece with preset breaking points between the base structure and the bracket part. The one-piece production or integral configuration enables simple and reliable handling and quick, even manual, assembly of the belt guide to the body element.

In alternative embodiments, the base structure and the bracket part can be produced separately and the connecting structure can comprise latching elements and counter-latching elements on the base structure and the bracket part that block movement of the bracket part relative to the base structure in pulling direction, i.e. a load acting to increase the distance between the body contact portion and the belt contact surface, and block movement in compression direction, i.e. a load acting to decrease the distance between the body contact portion and the belt contact surface, up to the predetermined load and allow relative movement when the predetermined load is exceeded. In other words, the connecting structure may not only be material-locking, but can also be force-locking. This can be achieved, for example, with spring elements and counter elements having steep surfaces that abut one another in pulling direction and relatively flatter wedge surfaces that abut in compression direction. In this type of design, for example, the base structure can be preassembled separately on the body part. However, it is also possible to preassemble the base structure with the bracket part and then mount it on the body part.

In embodiments, the bracket part comprises two parallel legs and a web portion extending between the legs, wherein the web portion comprises the belt contact surface and the legs extend away from the belt contact surface at right angles to the web portion, wherein each leg is connected to the base structure via at least one connecting point of the connecting structure, wherein each connecting point is configured to hold the respective leg such that it cannot move relative to the base structure in a normal state and to yield under the action of the predetermined load to cause the release state. It is thus possible for the belt guide to bear broadly against the body using the two lateral legs and to hold the belt securely, even when it is pulled sideways.

Alternatively, embodiments having only one leg are also conceivable, but these are less stable using the same amount of material. On the other hand, a certain amount of flexibility when being pulled sideways can be advantageous in cases in which this is desired.

In embodiments, the base structure comprises two base elements, each of which is connected to one of the legs. Such a configuration of the base structure saves material and allows the belt guide to be mounted with the belt preassembled on the body if the belt guide is in one piece. Alternatively, base structures in which the base structure is configured to be continuous over the width between the two legs are conceivable as well. In this case, it can be advantageous for the belt guide to have a multipart design, so that the belt can be enclosed between the base structure and the bracket part during assembly to avoid having to thread the belt through.

In embodiments, the base structure or each base element comprises a receiving portion which accommodates a respective leg of the bracket part and guides it in the release state.

In embodiments, when viewed from the web portion, one leg of the bracket part projects beyond an abutment plane formed by the body contact portion. In this way, the leg can project through an aperture in a body panel of the body part and, in the release state, can submerge into a cavity in the body part. This can facilitate the assembly of the belt guide and can also extend a movement path of the bracket part.

The leg of the bracket part can comprise at least one elastic latching element, such as a spring tab, which projects beyond a contour of the leg in a direction pointing away from an extension direction of the leg in the relaxed state and is configured to move back behind the contour of the leg under pressure from the outside and to spring back outward when the pressure is released, and which comprises a latching surface that faces the body contact portion in the extension direction of the leg. The leg can thus be inserted into the aperture by displacing the spring tab by edges of the aperture, and the body panel can be clamped between the latching surface of the elastic member and the body contact surface of the base structure. In other words, the latching surface of the elastic latching element can abut an inner abutment surface of the body panel and the body contact surface of the base structure can abut an outer abutment surface of the body panel. Inside and outside here relate to the cavity in the body part.

The elastic latching element can optionally comprise an abutment surface which faces in the direction pointing away from the extension direction of the leg and is aligned with the contour of the leg or projects slightly beyond it. Such an abutment surface can bear against the edges of the aperture and prevent the elastic element from moving away from the leg.

In embodiments, the body contact portion comprises at least one elastic support element, such as a spring support or a wing, that projects from the receiving portion and is configured to resiliently bear against an outer abutment surface of the body part. Clamping can thus be achieved safely and without a rattle.

Another aspect of the invention relates to an arrangement of a belt guide on a body part, in particular a B-pillar, of a motor vehicle. According to the invention, the belt guide is configured or fastened such that a part of the belt guide facing the passenger compartment can yield in the direction of the body part under the action of a load at or exceeding a predetermined limit, in particular a load acting perpendicular to the body part, and can preferably submerge partly into a cavity in the body part. The belt guide can be configured as described above. The arrangement achieves the same advantages as the belt guide by itself.

BRIEF DESCRIPTION OF THE DRAWINGS

Further technical features, advantages, objects and specific design examples of the invention will become apparent from the accompanying drawings and the following explanatory list of reference signs. The drawings show.

DETAILED DESCRIPTION

Figure 1:
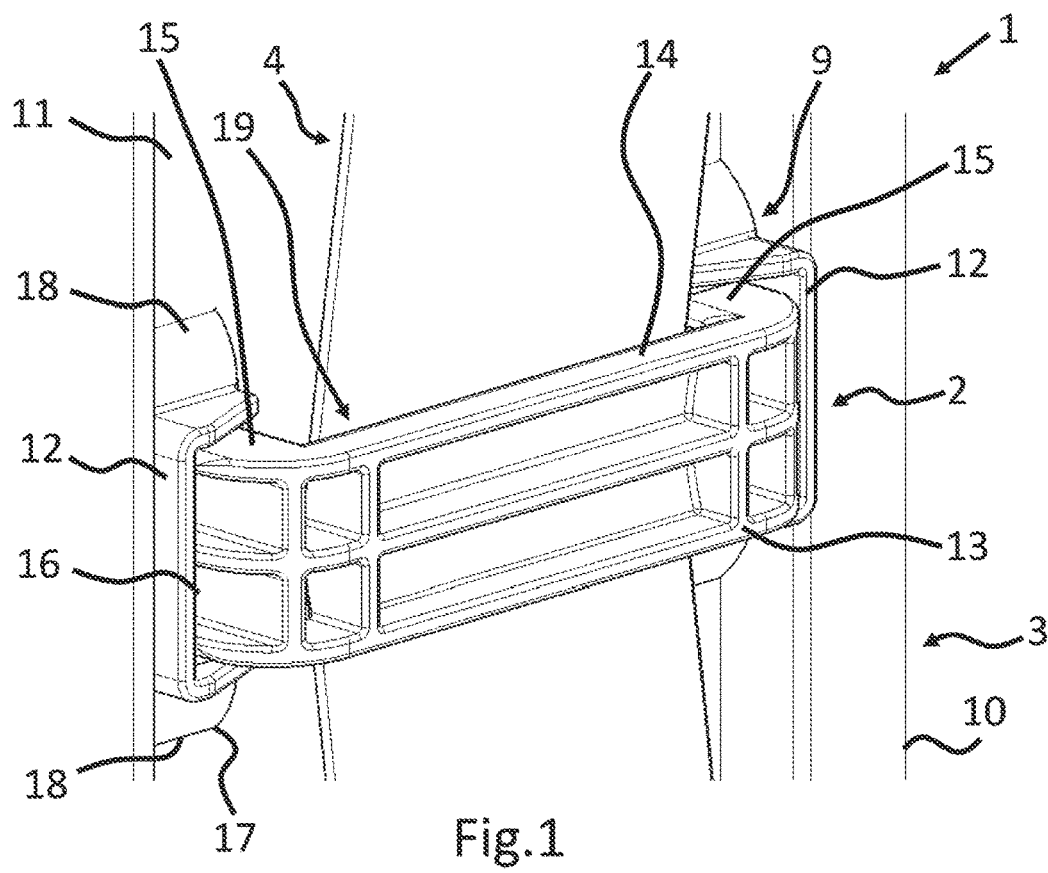
FIG. 1 a belt guide according to a design example of the invention in an arrangement on a body part with a guided belt (detail) in a perspective view in a normal position.
Figure 2:
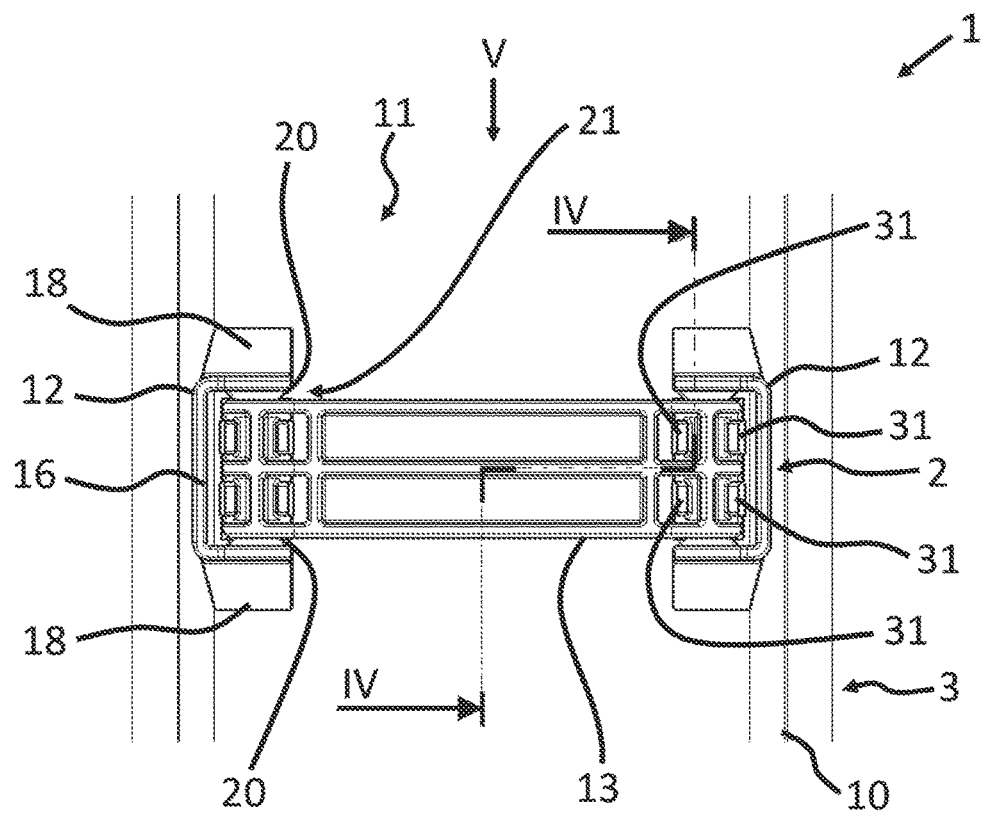
FIG. 2 the arrangement of FIG. 1 without a belt in a front view.

The figures are to be understood as purely schematic, without implying a limitation to specific angular or dimensional relationships, unless expressly so described. To simply the description and without implying a limitation to the orientation in space, axes and directions are described in the context of the described design examples with respect to a body part on which the belt guide according to the invention is disposed. Therefore, an extension direction of a belt in the belt guide along a body part defines a vertical direction, a viewing direction onto the body part from the belt side defines a frontal direction, and a direction transverse to the vertical and frontal directions defines a lateral direction. Additionally, one belt side is referred to as outside with respect to the body part, and a belt side on the other side of a panel of the body part to which the belt guide is mounted is referred to as inside with respect to the body part. Inside and outside therefore also relate to a cavity in the body part.

In the context of this application, specifications such as parallel, right-angled, flat, straight, circular, unmovable or the like are always to be understood to mean that production-related deviations or deviations that do not impair the described functionality are permissible and included.

The figures show a belt guide 2 in an arrangement 1 with a body part 3 according to a design example of the invention. Parts of the arrangement 1 and the belt guide are specified in the attached list of reference signs. For the structural details and features, reference is made to the accompanying figures.

The belt guide 2 according to the invention comprises a base structure 9 via which the belt guide can be connected to a body part and a bracket part 13 for guiding a seatbelt 4 (FIGS. 1 to 5B). The belt guide 2 comprising the base structure 9 and the bracket part 13 is formed in one piece and is preferably made of plastic by means of a 1-component injection molding process.

The bracket part 13 comprises two parallel legs 15 and a web portion 14 which extends orthogonally to the two legs 15. The web portion 14 comprises a belt contact surface 19 so that the legs 15 extend away from the belt contact surface 19 at right angles to the web portion 14.

Each leg 15 is connected to the base structure 9 via at least one and preferably two connecting points 20 of a connecting structure 21. The connecting points 20 are configured in a material-locking manner as preset breaking points. Such preset breaking points are embodied as reductions in the cross-section.

The connecting structure 21 preferably forms an integral connection between the base structure 9 and the bracket part 13 in a normal state and comprises at least the one connecting point 20 that breaks under the action of the predetermined load to cause the release state.

The base structure 9 in particular comprises two base elements 12, each of which is connected to one of the legs 15.

For this purpose, the base structure 9 or each base element 12 comprises a receiving portion 16, which accommodates a respective leg 15 of the bracket part 13 and guides it in the release state.

The connecting structures 21 are preferably disposed in connecting regions between side walls of the receiving portions 16 and the legs 15 and connect the base element 12 and the bracket part 13. The connecting structures are configured such that the connecting structures 21 or the preset breaking points extend approximately orthogonally to a load, in particular a load acting perpendicular to the body part 3.

In alternative embodiments, the base structure and the bracket part can be produced separately and the connecting structure 21 can comprise (not depicted) latching elements and counter-latching elements on the base structure and the bracket part to form the connecting points that block movement of the bracket part relative to the base structure in pulling direction, i.e. a load acting to increase the distance between the body contact portion and the belt contact surface, and block movement in compression direction, i.e. a load acting to decrease the distance between the body contact portion and the belt contact surface, up to the predetermined load and allow relative movement when the predetermined load is exceeded.

In other words, the connecting structure may not only be material-locking, but can also be force-locking. This can be achieved, for example, with spring elements and counter elements having steep surfaces that abut one another in pulling direction and relatively flatter wedge surfaces that abut in compression direction. In this type of design, for example, the base structure can be preassembled separately on the body part. However, it is also possible to preassemble the base structure with the bracket part and then mount it on the body part.

Such an embodiment can also be made of plastic by means of a 1-component injection molding process, whereby the two parts are joined to one another either automatically in a suitable injection molding system or manually after production.

The connecting points 20 are configured to hold the respective leg 15 such that it cannot move relative to the base structure 19 in a normal state and to yield under the action of a predetermined load to allow the bracket part 13 to move relative to the base structure 9 and toward the body contact portion 17 in the release state.

A body contact portion 17 for abutting a body part 3 is configured on the base element 12 and extends approximately parallel to the bracket part 13.

The body contact portion 17 or a body abutment preferably comprises two diametrically opposite elastic support elements 18 or leaf spring-like spring elements, such as a spring support or a wing, which project or protrude from the base structure 9 or the receiving portion 16 of the base element 12 and are configured to bear resiliently against an outer abutment surface 11 of the body part 3.

The legs 15 of the bracket part 13 each comprise four elastic latching elements 31, for example, such as a spring tab, which projects beyond a contour of the leg 15 in a direction pointing away from an extension direction of the leg 15 in a relaxed state.

The latching elements 31 are configured to move back behind the contour of the leg 15 under pressure from the outside and to spring back outward when the pressure is released. The latching elements 31 comprise a latching surface 32 that faces the body contact portion in the extension direction of the leg 15.

The belt guide 2 or the base structure 9, in particular the base element 12, is acted upon by a force pointing away from the body part 3 via the elastic support elements 18.

The base structure 19 or the base element 12 is connected to an edge of the body part 3 that delimits a through-opening via the latching elements 31. The belt guide 2 can then move or submerge into this through-opening in the event of an accident.

Then, if the web portion 14 of the bracket part 13 is acted upon by a force, for example in the event of an accident, in particular a side impact, the bracket is separated at connecting points 20 via which the bracket part 13 is connected to the base element 12 and can submerge into the body part, preferably a B-pillar, via the through-opening.

Figure 3A:
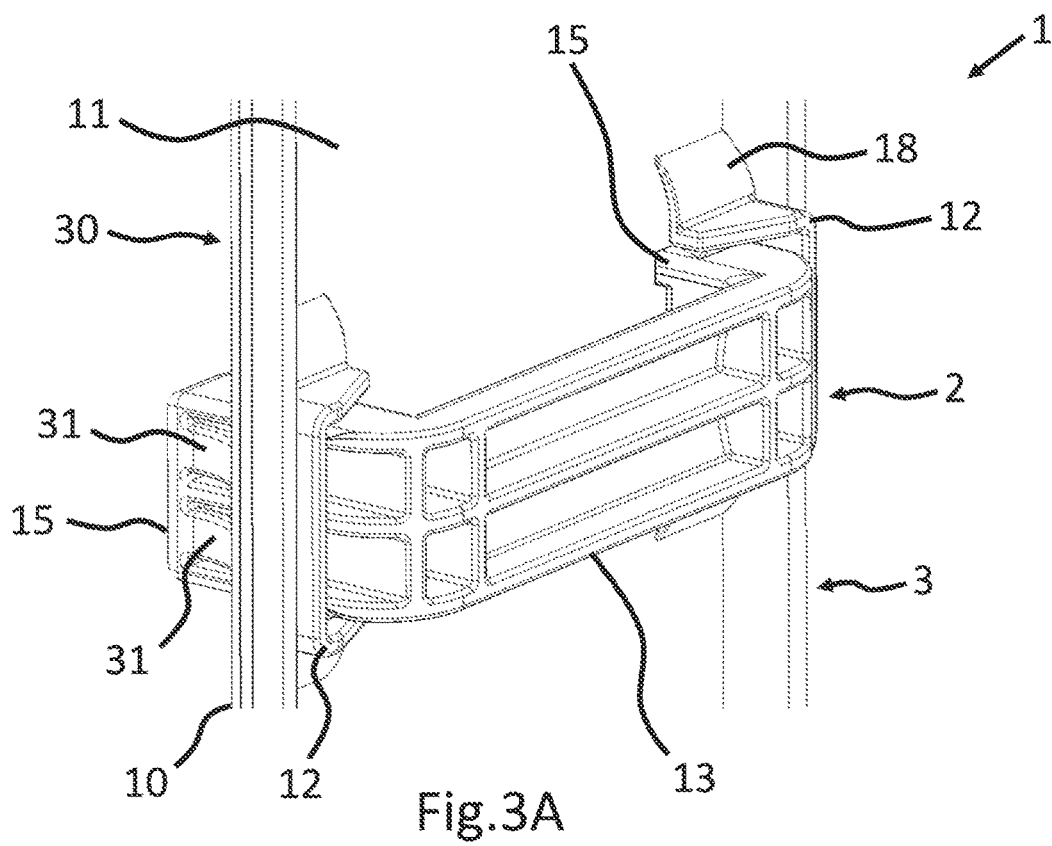
FIG. 3A the arrangement of FIG. 1 without a belt in a perspective view with the body panel broken away laterally to show hidden parts of the belt guide in the normal state of the belt guide.
Figure 3B:
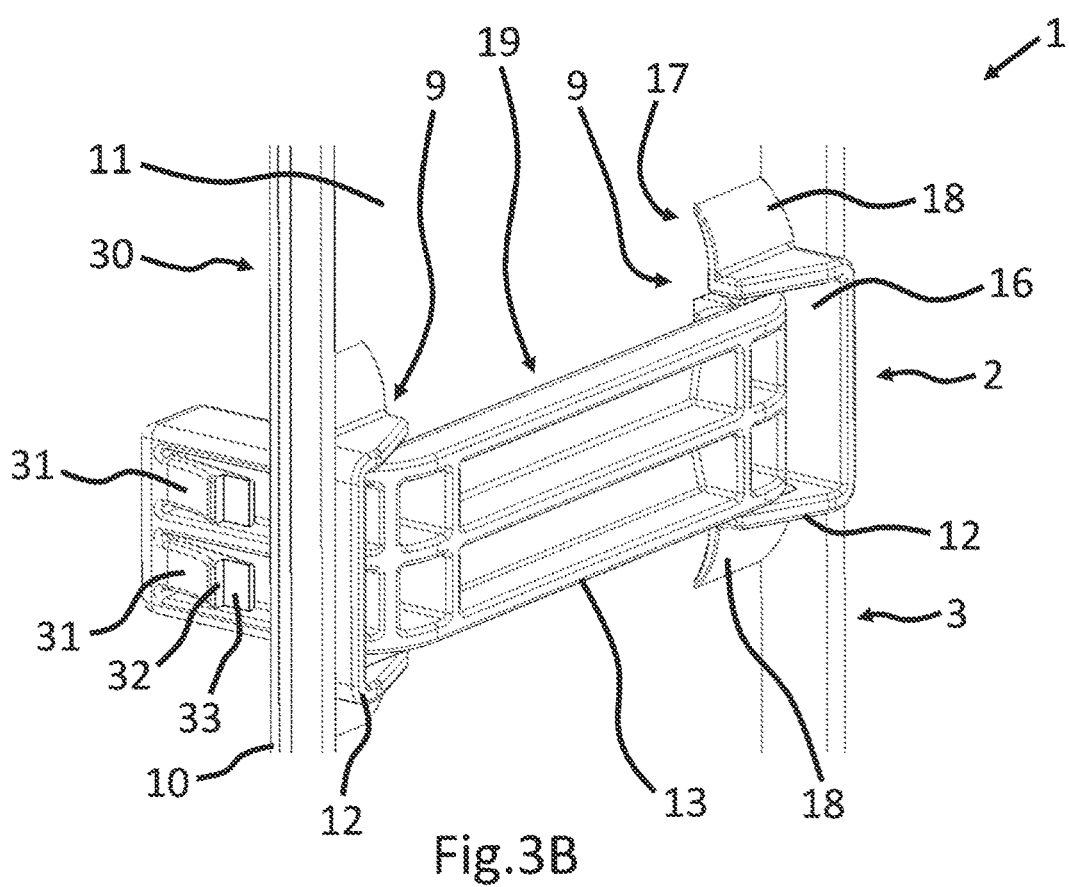
FIG. 3B the view of FIG. 3B in a release state of the belt guide.
Figure 4A:
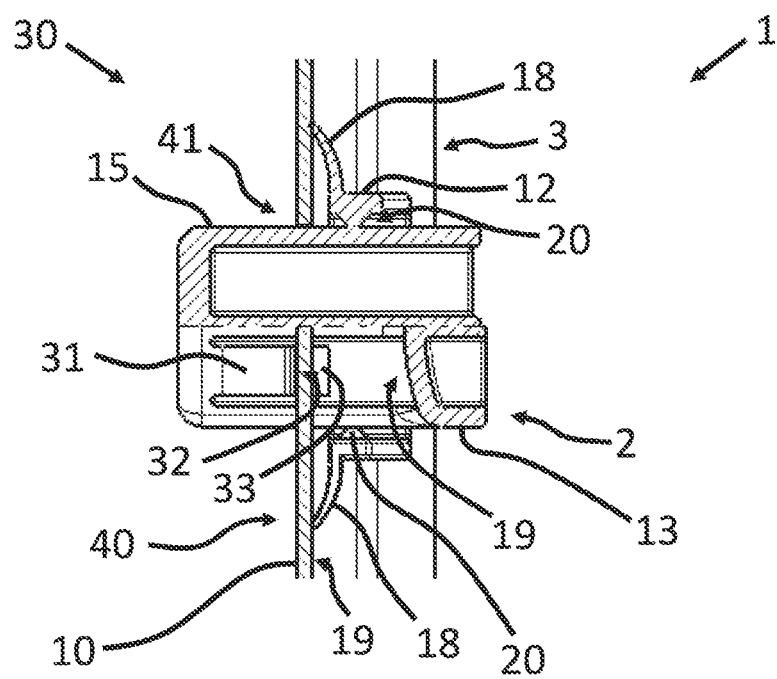
FIG. 4A the arrangement of FIG. 1 without a belt in a sectional view corresponding to a section line IV-IV in FIG. 2 in the normal state of the belt guide.
Figure 4B:
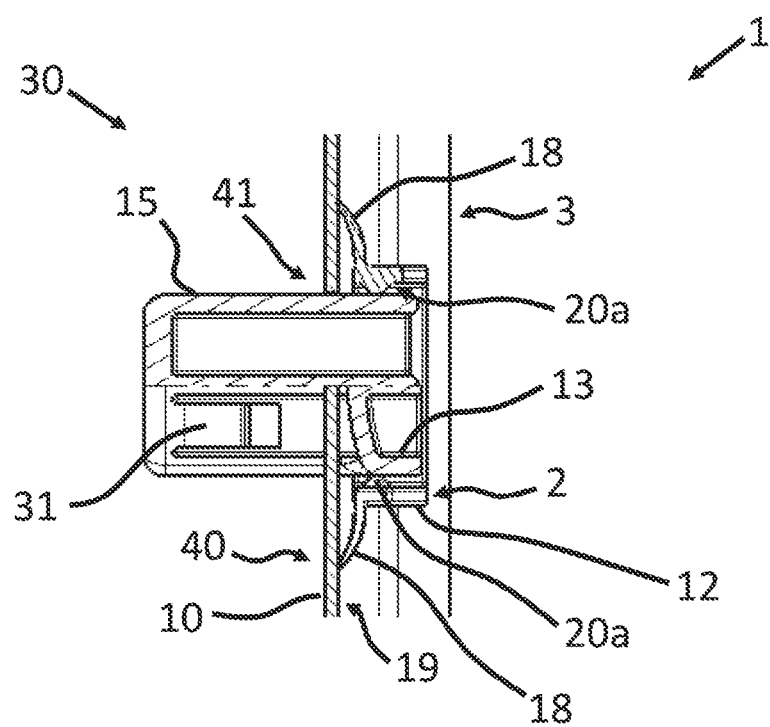
FIG. 4B the view of FIG. 4B in a release state of the belt guide.
Figure 5A:
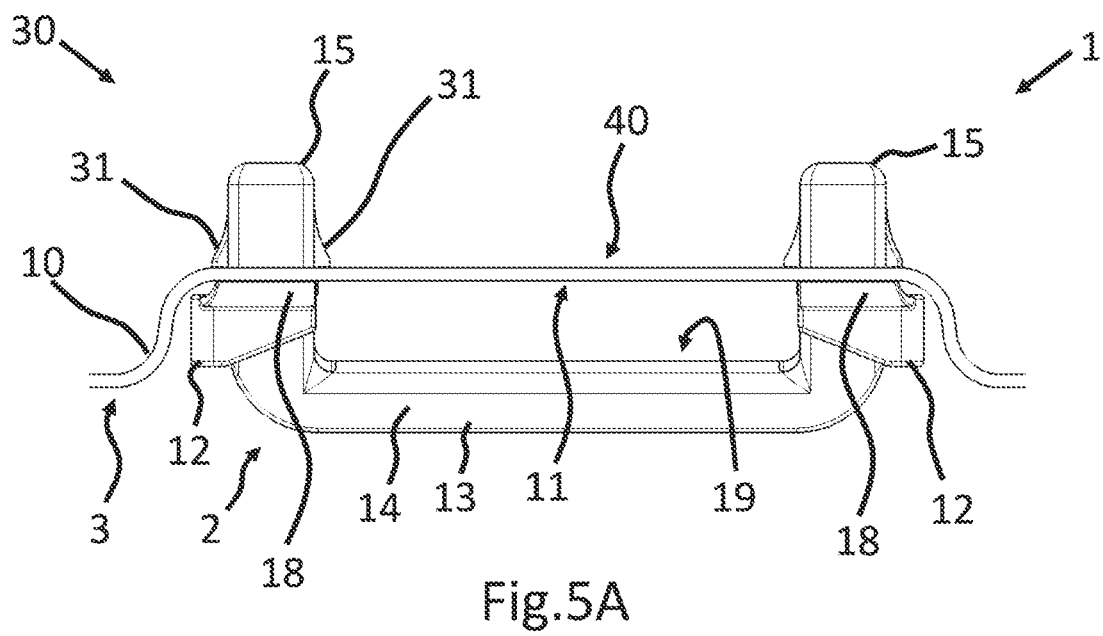
FIG. 5A the arrangement of FIG. 1 without a belt in a plan view in the normal state of the belt guide.
Figure 5B:
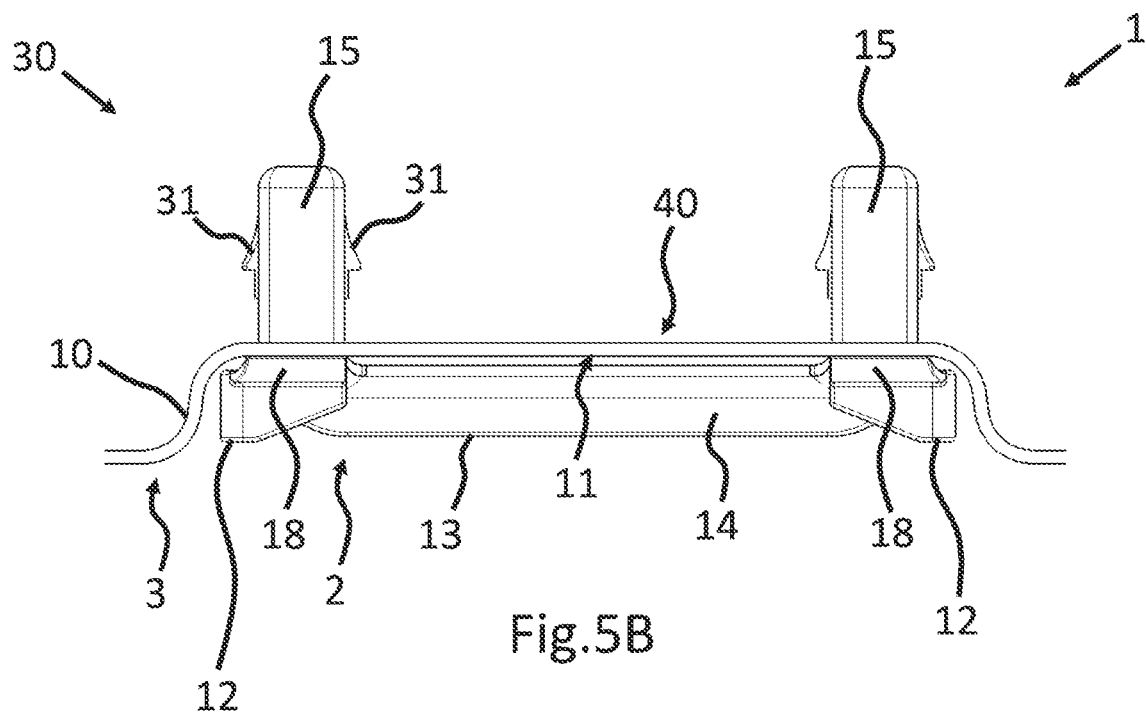
FIG. 5B the view of FIG. 5B in a release state of the belt guide.

FIGS. 1, 3A, 4A, 4B show a normal state with an intact connecting portion 21. FIGS. 3B, 4B, 5B show a release state with a detached or separated (i.e. here: destroyed) connecting portion 21. As described, multipart, force-lockingly connected solutions are conceivable as well.

The belt guide 2 can be made of plastic, for example a thermoplastic, optionally fiber-reinforced, [or] any other suitable plastic. This makes it possible to achieve low weight in comparison with conventional steel guides. The belt guide can be produced using known plastic processing methods such as injection molding, plastic die casting or additive processes. The belt guide 2 can alternatively also be made of a metal. In particular in the case of multipart solutions, the bracket part 13 or the base elements 12 can be made of metal, for example, and the respective other element can be made of plastic. The body part 3 can be made of sheet steel or any other material that is conceivable in the automotive industry.

In the shown design example, the legs 15 are guided through the receiving portions 16 of the base elements 12 and the edges of the apertures 40 of the body panel 10. The body panel 10 is clamped between the elastic support elements 18 and the latching surfaces 32 of the elastic latching elements 31. It is also conceivable for the fastening to the body panel 10 and/or the guidance of the legs 15 to be provided solely by the base elements 12.

The invention has been illustrated and discussed above on the basis of currently preferred embodiments and a design example and variants (which can also be referred to as modifications, further developments, alternatives or options). The invention itself is defined by the attached claims. The presentation serves the purpose of explaining and understanding the claimed invention. Individual features of the design example/an embodiment or variants can be combined with features of any other embodiment or related variants individually or in any selection and shall also be considered disclosed in such combination, even if they are not expressly described as such, unless this would be obviously impossible or pointless for technical or physical reasons. Conversely, individual features of the design example/an embodiment or its variants do not limit the invention and can be omitted if the remaining combination of features solves a technical problem. In particular, any combination of individual features of one or more design examples/embodiments shown here that solves a technical problem can form a separate subject matter of the invention.

LIST OF REFERENCE SIGNS

1 Arrangement
2 Belt guide
3 Body part (e.g. B-pillar)
4 Belt
9 Base structure
10 Body panel
11 Outer abutment surface
12 Base element
13 Bracket part
14 Web portion
15 Leg
16 Receiving portion
17 Body contact portion
18 Elastic support element (spring support, wing)
19 Belt contact surface
20 Connecting point
20*a* Connecting point (released)
21 Connecting structure
30 Cavity
31 Elastic latching element (spring tab)
32 Latching surface
33 Abutment surface
40 Inner abutment surface
41 Aperture (opening)

The foregoing list is an integral part of the description.

The invention claimed is:

1. A belt guide having a base structure and a bracket part, wherein the base structure comprises a body contact portion which is configured to abut a body part, wherein the bracket part is connected to the base structure via a connecting structure and comprises a belt contact surface which faces the base structure to guide a belt between the belt contact surface and the body part or the base structure abutting the body part, wherein the connecting structure is configured to hold the bracket part such that it cannot move relative to the base structure in a normal state and to yield under an action of a load which is at or exceeds a predetermined limit to allow the bracket part to move relative to the base structure toward the body contact portion in a release state; wherein the belt contact surface, together with the body part or the base structure abutting the body part, forms a belt guide slot, wherein, in the release state, a depth of the belt guide slot is reduced by movement of the bracket part.

2. The belt guide according to claim 1,
wherein
the connecting structure forms an integral connection between the base structure and the bracket part in the normal state and comprises at least one connecting point that breaks under the action of the load which is at or exceeds the predetermined limit to cause the release state.

3. The belt guide according to claim 1,
wherein
the bracket part comprises two parallel legs and a web portion extending between the legs, wherein the web portion comprises the belt contact surface and the legs extend away from the belt contact surface at right angles to the web portion, wherein each of the legs connected to the base structure via at least one connecting point of the connecting structure, wherein, for each of the legs, the at least one connecting point is configured to hold the leg such that it cannot move relative to the base structure in the normal state and to yield under the action of the load which is at or exceeds the predetermined limit to cause the release state.

4. The belt guide according to claim 3,
wherein
the base structure comprises two base elements, each of which is connected to one of the legs.

5. The belt guide according to claim 3,
wherein
the base structure or each base element comprises a leg receiving portion.

6. The belt guide according to claim 3,
wherein,
when viewed from the web portion, each of the legs of the bracket part projects beyond an abutment plane formed by the body contact portion.

7. The belt guide according to claim 6,
wherein
the leg of the bracket part comprises at least one elastic latching element that projects beyond a contour of the leg in a direction pointing away from an extension direction of the leg in the release state and is configured to move back behind the contour of the leg under pressure from the outside and to spring back outward when the pressure is released, and which comprises a latching surface that faces the body contact portion in the extension direction of the leg.

8. The belt guide according to claim 7,
wherein
the elastic latching element comprises an abutment surface which faces in the direction pointing away from the extension direction of the leg and, in the release state, is aligned with the contour of the leg or projects slightly beyond it.

9. The belt guide according to claim 1,
wherein
the body contact portion comprises at least one elastic support element, which projects from the base structure and is configured to bear resiliently against an outer abutment surface of the body part.

10. An arrangement of a belt guide on a body part formed as a B-pillar, of a motor vehicle, wherein the belt guide is configured or fastened such that a part of the belt guide facing the passenger compartment yields in the direction of the body part under the action of a load which exceeds a predetermined limit from a load acting perpendicular to the body part, wherein the belt guide is configured according to claim 1.

11. A belt guide having a base structure and a bracket part, wherein the base structure comprises a body contact portion which is configured to abut a body part, wherein the bracket part is connected to the base structure via a connecting structure and comprises a belt contact surface which faces the base structure to guide a belt between the belt contact surface and the body part or the base structure abutting the body part, wherein the connecting structure is configured to hold the bracket part such that it cannot move relative to the base structure in a normal state and to yield under an action of a load which is at or exceeds a predetermined limit to allow the bracket part to move relative to the base structure toward the body contact portion in a release state;
- wherein the bracket part comprises two parallel legs and a web portion extending between the legs, wherein the web portion comprises the belt contact surface and the legs extend away from the belt contact surface and the web portion;
- wherein the base structure comprises two base elements, each of which is connected to one of the legs.

12. A belt guide having a base structure and a bracket part, wherein the base structure comprises a body contact portion which is configured to abut a body part, wherein the bracket part is connected to the base structure via a connecting structure and comprises a belt contact surface which faces the base structure to guide a belt between the belt contact surface and the body part or the base structure abutting the body part, wherein the connecting structure is configured to hold the bracket part such that it cannot move relative to the base structure in a normal state and to yield under an action of a load which is at or exceeds a predetermined limit to allow the bracket part to move relative to the base structure toward the body contact portion in a release state;
- wherein the body contact portion comprises at least one elastic support element, which projects from the base structure and is configured to bear resiliently against an outer abutment surface of the body part.

13. An arrangement, comprising:
- a body part formed as a B-pillar of a motor vehicle having a passenger compartment;
- a belt guide located on the body part, wherein the belt guide is configured or fastened such that a part of the belt guide facing the passenger compartment yields in a direction of the body part under an action of a load which acts perpendicular to the body part and exceeds a predetermined limit;
- wherein the belt guide includes a base structure and a bracket part, wherein the base structure comprises a body contact portion which is configured to abut the body part;
- wherein the bracket part is connected to the base structure via a connecting structure and comprises a belt contact surface which faces the base structure to guide a belt between the belt contact surface and the body part or the base structure abutting the body part;
- wherein the part of the belt guide facing the passenger compartment comprises the belt contact surface;
- wherein the connecting structure is configured to hold the bracket part such that it cannot move relative to the base structure in a normal state and to yield under the action of the load which acts perpendicular to the body part and exceeds the predetermined limit to allow the bracket part to move relative to the base structure toward the body contact portion in a release state.

\* \* \* \* \*